June 16, 1925.

L. W. EGGLESTON

AIR VALVE

Filed Feb. 4, 1921

Inventor
LEWIS W. EGGLESTON

June 16, 1925.  1,541,929
L. W. EGGLESTON
AIR VALVE
Filed Feb. 4, 1921   2 Sheets-Sheet 2
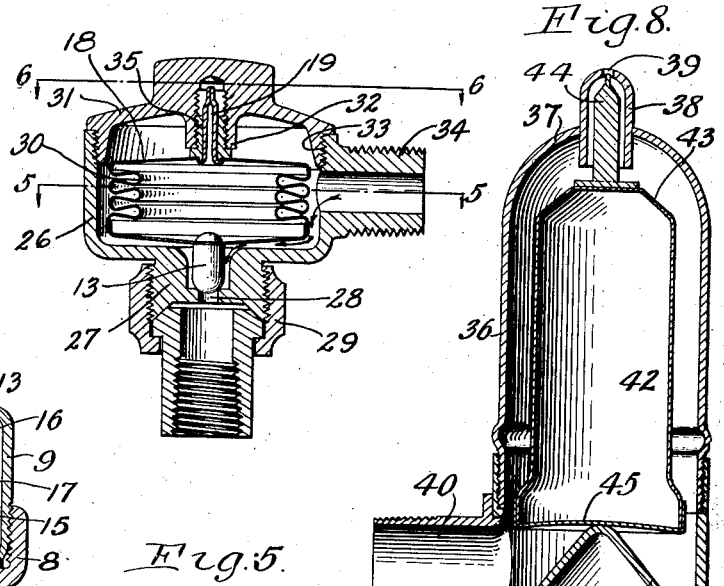
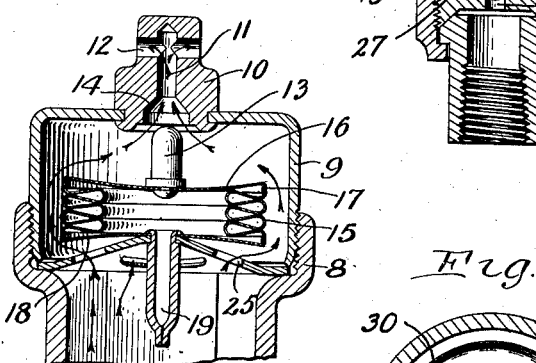
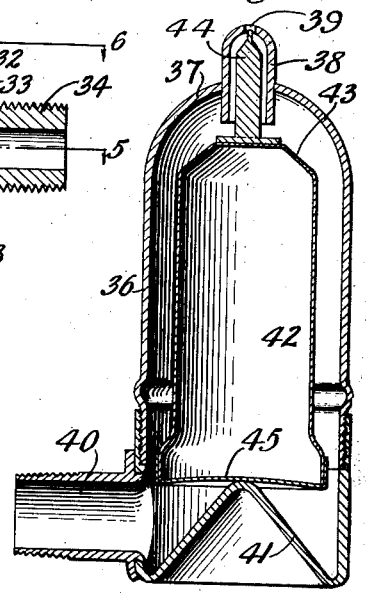
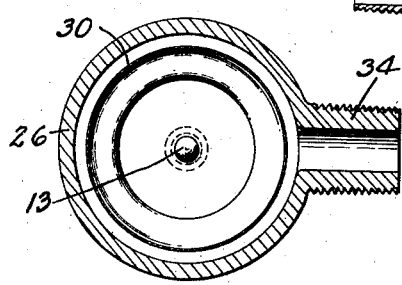
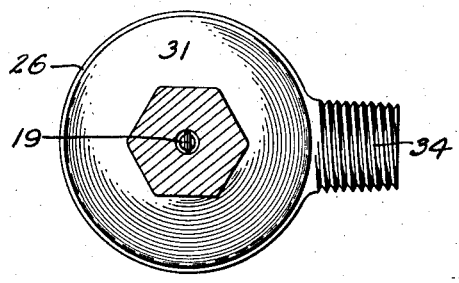
Inventor
LEWIS W. EGGLESTON Patented June 16, 1925.

1,541,929

UNITED STATES PATENT OFFICE.

LEWIS W. EGGLESTON, OF BUFFALO, NEW YORK, ASSIGNOR TO AMERICAN RADIATOR COMPANY, OF CHICAGO, ILLINOIS, A CORPORATION OF NEW JERSEY.

AIR VALVE.

Application filed February 4, 1921. Serial No. 442,536.

*To all whom it may concern:*

Be it known that I, LEWIS W. EGGLESTON, a citizen of the United States, residing at Buffalo, in the county of Erie and State of New York, have invented new and useful Improvements in Air Valves, of which the following is a full, clear, concise, and exact description, reference being had to the accompanying drawing, forming a part of this specification.

My invention relates to elastic elements and has for one of its objects to provide an elastic element for use in connection with apparatus or devices subject to temperature or pressure variations for operating valves or other mechanism, and the invention consists in the improvements to be more fully described hereinafter and the novelty of which will be particularly pointed out and distinctly claimed.

For the purpose of disclosing my invention I have illustrated certain embodiments thereof in the accompanying drawings. In said drawings:

Fig. 4 is a sectional view of a valve embodying a modified form of my invention;

Fig. 5 is a sectional view taken on the line 5—5 of Fig. 4, looking in the direction of the arrows;

Fig. 6 is a sectional view taken on the line 6—6 of Fig. 4;

Fig. 7 is a view similar to Fig. 1 showing the valve open; and

Fig. 8 is a sectional view showing a further modification of my invention.

Figure 1:
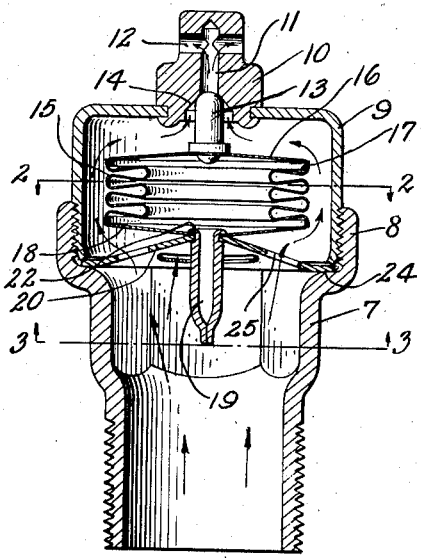
Figure 1 is a longitudinal sectional view of a valve embodying my invention.
Figure 2:
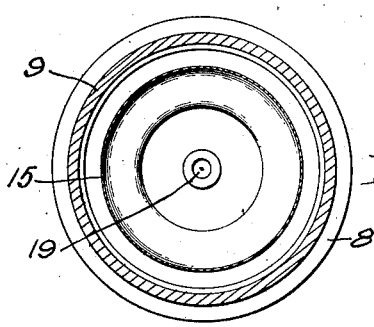
Fig. 2 is a transverse view of the valve taken on the line 2—2 of Fig. 1 and looking in the direction of the arrows.
Figure 3:
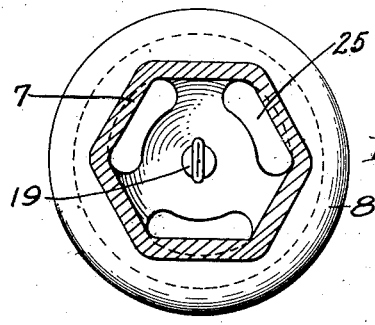
Fig. 3 is a sectional view taken on the line 3—3 of Fig. 1, looking in the direction of the arrows.

In the embodiment of the invention illustrated in Figs. 1 to 3 I provide a suitable casing 7 having an enlarged cylindrical upper portion 8 which is screw-threaded to receive a cup shaped cover 9. This cover at its upper end is provided with a boss or nipple 10 preferably riveted in an opening formed in the top of the cover and having a vertical port 11 which communicates at its top with a horizontal port 12. The lower end of the casing 7 is screw-threaded for attachment to the air pipe of a heating system.

The port 11 is controlled by a valve which comprises a cylindrical plug 13 rounded on its end and adapted to engage the valve seat 14 formed in the boss or nipple 10 and which opens into the port 11. This valve 13 is riveted at its lower end to the top closure member of an expansible-collapsible member, as will be described.

The novel expansible-collapsible member comprises a cylindrical shell having a thin side wall preferably circumferentially corrugated as shown in Figs. 1, 4 and 7, to form a series of corrugations or folds 15, a flat annular band portion being left at each end. Closing the upper end of this shell is a closure head or wall consisting of a disc 16 having an annular flange 17 fitted within the upper end of the shell, the two parts being soldered, brazed or otherwise secured together, to form a gas tight joint. This closure disc 16 is normally bowed or dished outwardly, and at its center has riveted thereon the valve 13, the joint being sealed by soldering, brazing or otherwise.

The opposite end of the shell is closed by a similar end closure disc 18 having its annular flange fitted within the shell and having centrally secured thereon a charging stem comprising a hollow tube 19 extending through the closure end 18 and riveted in position the joint being made gas tight. This tube also provides a sealing or connecting rivet for a circular supporting disc 20 on which the expansible-collapsible member is mounted. This disc 18 is also dished outwardly and has a central opening therein through which the tube 19 passes, said tube having a shoulder adapted to engage the disc and being flanged or riveted over as at 22 on the inside of the closure disc 18. The supporting disc 20 at its outer periphery is clamped between the lower edge of the cover 9 and a shoulder 24 formed by the enlargement 8 of the casing 7, whereby the lower end of the expansible-collapsible member is clamped rigidly in place while the upper end is free to move and carry with it the valve 13. To permit the escape of air through the disc and up through the ports 11 and 12 the supporting disc 20 is provided with a series of openings 25. The heads or ends 16 and 18, are made of suitable resilient metal or other suitable material and in making are normally dished so that the resiliency thereof tends to restore or maintain them in such normal or dished position, and said heads or ends when secured in position in the ends of the shell are arranged so that the normal resiliency tends at all times to cause said heads or ends to bulge or flex outwardly relative to the shell, as shown in Figs. 1 and 4.

The length of the expansible-collapsible member is such that when it, including its dished ends, is expanded under its normal spring tendency to its limit, the valve 13 will be seated. The expansible-collapsible member has created therein a partial vacuum by which it is collapsed and the ends or heads 16, 18 held inwardly dished against the normal tendency of said ends to spring outwardly as heretofore described, so that there is a tendency of the expansible-collapsible member under the influence of its inherent spring action to expand and a tendency of the ends under their inherent spring action to dish or bulge outwardly against the effect of the partial vacuum. In other words the existence of the vacuum or rarified atmosphere or condition within the shell draws or dishes the end or ends inward relative to the element 15 from their normal position, and holds it or them, against outward movement due to this normal spring tendency.

In a preferred form of the invention, a charge of volatile liquid is also inserted in the expansible-collapsible member after which the expansible-collapsible member is sealed, this charge of volatile liquid being so determined that when a predetermined temperature is reached sufficient pressure will be generated in the expansible-collapsible member to cause it to move to what might be termed its neutral position that is, the position it would assume when expanded to its limit by its normal spring action. I have found that when the expansible-collapsible member is charged in a temperature of 70° Fahrenheit with one-fifth of a cubic centimeter of a mixture consisting of 85% distilled water and 15% wood alcohol or approximately 75% distilled water and 25% ethyl alcohol and a vacuum of fifteen inches of mercury created therein, said member will move to its neutral position when the temperature reaches 180° Fahrenheit.

The operation of my valve and of the expansible-collapsible member is obvious. With the volatile liquid in the expansible-collapsible member in a condensed form the partial vacuum partially collapses the expansible-collapsible member and draws the heads inward, whereby the valve is held in open position, as shown in Fig. 7. If steam is admitted to the system adapted to be controlled by the valve, the steam pushes ahead of it such air as is in the system which air escapes through the port 11 in the valve. As soon, however, as the steam following the air comes in contact with the expansible-collapsible member the volatile liquid contained therein is expanded to the point where the expansible-collapsible member will expand and the heads spring outward so as to seat the valve, the seating point of the valve, as heretofore explained, being reached when the expansible-collapsible member, inclusive of its end or ends, has expanded to the limit of its tendency to move under its normal spring action.

By the above construction of the expansible-collapsible member I am enabled to obtain in manufacture a uniformity of operation of any number of valves irrespective of the variations of the metal, forming the expansible-collapsible member which varies the spring tension thereof. Commercially, it is practically impossible to obtain an absolute uniformity of the thickness of the walls of a large number of expansible-collapsible members. As a result, the expansible-collapsible members will vary in flexibility, some of the members being stiffer than the others. However, if the expansible-collapsible members are of the proper length so that the valve will be seated when the expansible-collapsible member is expanded to its limit by its inherent spring action only, and the partial vacuum and charge of volatile liquid in each of the expansible-collapsible members is the same then each expansible-collapsible member will close its valve at the same temperature.

In Figs. 4, 5 and 6 I have illustrated a modified form of valve employing the expansible-collapsible member. In the structure illustrated in these figures I provide an annular casing 26 having a reduced neck 27 through which passes an escape port 28. This reduced neck 27 is exteriorly screw-threaded to receive a union 29 to connect the same with a vent pipe. For controlling the port 28 a valve 13 similar to the valve 13 shown in Fig. 1 is provided and this valve is operated by an expansible-collapsible member 30 similar in construction to the expansible-collapsible member illustrated in Fig. 1.

The casing 26 is closed by a cover 31 having an interiorly threaded socket 32 in the center thereof and having an exteriorly threaded flange 33 which screws into the casing. The charging stem 19 of the expansible-collapsible member passes through a nut 35. This nut is screw-threaded into the socket 32 formed in the casing cover and provides a means for stationarily supporting the upper end of the expansible-collapsible member. A flow connection 34 is provided on the casing connecting the valve casing with the riser or other vent pipe.

The operation and charging of the device is similar to that illustrated in Fig. 1. The air passing through the flow connection 34 passes out through the vent 28. As soon as the steam following the air strikes the expansible-collapsible member 30 this member, inclusive of its ends, is expanded and the valve seated thereby closing the vent and preventing the escape of steam.

In Fig. 8, wherein I have shown another embodiment of the same broad invention, the chamber or casing 36 is closed at its upper end by a dome 37, in which is secured a valve seat 38, having an escape-orifice 39, said casing being provided adjacent its lower end with an inlet passage or nipple 40 connected to the steam pipe, radiator or the like. The bottom of the casing is provided with a suitable abutment, preferably constituted by forming said bottom cone-shaped, as at 41. In this form of the invention, instead of employing a corrugated expansible-collapsible shell, as in the forms previously described, I provide a cylindrical shell 42, the upper end of which may be dome-shaped, as at 43, and carries a valve 44 adapted to cooperate with the escape opening heretofore mentioned. The lower end of the shell 42 is closed by means of a head or wall 45 constructed in the same manner as the heads or ends 16 and 18, heretofore described. The same conditions may be maintained within the cylinder 42 as heretofore described with reference to the corrugated members, and under which the wall or head 45 is normally dished inward by the partial vacuum within said cylinder. The head 45 normally rests upon the cone-shaped abutment 41, and upon an increase of temperature, causing expansion within said shell, said head exerts its force against said abutment to move the cylinder and the valve carried thereby toward the valve-seat to close the opening through the latter.

While I have described the expansible-collapsible member as being charged with a volatile liquid it will be understood that any fluid or gas expansible under the influence of heat may be depended upon for this purpose.

Also, while I have shown and described certain embodiments of my invention, it will be understood that my invention may be embodied in other forms and structures, and the embodiment illustrated may be modified without departing from the spirit of the invention as set forth in the appended claims.

Having thus described my invention, what I claim as new and desire to secure by Letters Patent is:

1. A device of the character described, comprising a closed shell having a head, said head being resilient and normally dished outward relative to the shell, the interior of said shell being rarefied to hold said resilient head flexed inward against its inherent resilient tendency to assume its normal outwardly dished position.

2. A device of the character described, comprising a closed shell having a head, said head being resilient and having a normal spring tendency to move outward relative to the shell, said shell being charged with a volatile liquid, and the interior thereof being rarefied so as to hold said resilient head against outward movement.

3. A device of the character described, comprising a shell, the ends of which are closed by heads, each of which consists of a resilient disc formed to normally bulge outward relative to the shell, and the interior of said shell being rarefied to hold said heads flexed inward against their normal resilient tendency to bulge outward.

4. A device of the character described, comprising an expansible-collapsible shell having circumferential corrugations and a head, said head being resilient and having an inherent tendency to spring outward relative to the shell, the interior of said shell being rarefied to hold said resilient head flexed inward against its inherent resilient tendency to assume its normal outwardly dished position.

5. A device of the character described, comprising a shell having a circumferentially corrugated body portion having closed end walls, a charging stem comprising a tube connecting to one of said end walls and opening therethrough, and a support for said expansible-collapsible member secured to and carried by said stem.

6. A resilient expansible-collapsible member having its side walls corrugated and having its ends closed by resilient heads normally dished outward relative to said member, the limit of the operating movement of said expansible-collapsible member being the limit of the normal spring tendency of the side walls to expand and the resilience of said heads to dish outwardly, said member being collapsed by a partial vacuum therein, and charged with a volatile liquid which, when subjected to a predetermined temperature will create sufficient pressure in said member to permit said member to expand to the limit of its normal spring movement.

In witness whereof, I have hereunto subscribed my name in the presence of two witnesses.

LEWIS W. EGGLESTON.

Witnesses:
F. MELSON,
P. E. STOKES.